United States Patent
McCaig et al.

(10) Patent No.: US 12,471,589 B2
(45) Date of Patent: Nov. 18, 2025

(54) PEST TRAPS

(71) Applicant: RENTOKIL INITIAL 1927 PLC, Crawley (GB)

(72) Inventors: John McCaig, Pulborough (GB); Oliver John Lindsey Milverton, Salisbury (GB); Christopher Ford, Hull (GB); Chris Bernd Reinink, Crawley (GB)

(73) Assignee: Rentokil Initial 1927 PLC (GB)

( * ) Notice: Subject to any disclaimer, the term of this patent is extended or adjusted under 35 U.S.C. 154(b) by 130 days.

(21) Appl. No.: 18/027,239

(22) PCT Filed: Aug. 9, 2021

(86) PCT No.: PCT/GB2021/052052
§ 371 (c)(1),
(2) Date: Mar. 20, 2023

(87) PCT Pub. No.: WO2022/058705
PCT Pub. Date: Mar. 24, 2022

(65) Prior Publication Data
US 2023/0371495 A1    Nov. 23, 2023

(30) Foreign Application Priority Data
Sep. 21, 2020 (GB) .................... 2014858

(51) Int. Cl.
*A01M 23/38* (2006.01)
*A01M 23/18* (2006.01)

(52) U.S. Cl.
CPC ............ *A01M 23/38* (2013.01); *A01M 23/18* (2013.01)

(58) Field of Classification Search
CPC ..... A01M 23/38; A01M 23/18; A01M 1/2038
See application file for complete search history.

(56) References Cited

U.S. PATENT DOCUMENTS 636,901 A * 11/1899 Johnson ............ A01M 23/18
43/61
723,100 A * 3/1903 White ............... A01M 23/18
43/61
(Continued)

FOREIGN PATENT DOCUMENTS

CL    2017003419 U1    4/2018
CN    106419872 A      2/2017
(Continued)

OTHER PUBLICATIONS

Rentokil 'RADAR Mouse Trap' product webpage, available at: https://www.renotkil.co.uk/assets/content/files/radar-human-mousetrap.pdf [accessed Feb. 22, 2021] See especially description, noting two entrances with infrared sensor enabled closing mechanism and use of C02 gas, Archived by archive.org on Jul. 5, 2016, available at: https://web.archive.Org/web/20160705104806/https://www.rentokil.co.uk/assets/conte.

(Continued)

*Primary Examiner* — Magdalena Topolski
(74) *Attorney, Agent, or Firm* — Buchanan Ingersoll & Rooney PC

(57) ABSTRACT

A pest trap comprising a main body. A first chamber connected to the main body has an opening arranged to allow a pest to enter the first chamber, there being a movable closure to the opening of the first chamber. A second chamber connected to the main body also has an opening arranged to allow a pest to enter the second chamber, again there being a movable closure to the opening of the second chamber. The pest trap is arranged, in response to a sensor mechanism detecting the presence of a pest in the first or second chamber, to close the movable closure to the opening of the first or second chamber, and to activate a kill mechanism to (Continued)

release a fluid into the first or second chamber to kill the pest.

13 Claims, 12 Drawing Sheets

(56) References Cited

U.S. PATENT DOCUMENTS

| | | | |
|---|---|---|---|
| 8,505,234 | B2 | 8/2013 | Nelson et al. |
| 8,960,740 | B2 * | 2/2015 | Huang .................... E05B 9/002 |
| | | | 292/357 |
| 10,292,654 | B2 * | 5/2019 | Lee ....................... A61B 5/6831 |
| 2004/0216364 | A1 | 11/2004 | Gosselin |
| 2011/0138676 | A1 | 6/2011 | Moustirats |
| 2013/0031824 | A1 | 2/2013 | Arlichson |
| 2019/0037829 | A1 | 2/2019 | Laut et al. |
| 2020/0005626 | A1 | 1/2020 | Triventi et al. |

FOREIGN PATENT DOCUMENTS

| | | |
|---|---|---|
| CN | 206728954 U | 12/2017 |
| CN | 208639439 U | 3/2019 |
| GB | 2472124 A | 1/2011 |
| WO | 0230189 A1 | 4/2002 |
| WO | 03082709 A1 | 10/2003 |
| WO | 2007068971 A1 | 6/2007 |

OTHER PUBLICATIONS

Great Britain Search Report for Great Britain Application No. GB2014858.1, dated Feb. 22, 2021, 4 pages.

Office Action (The First Office Action) issued May 8, 2025, by the State Intellectual Property Office of People's Republic of China in corresponding Chinese Patent Application No. 202180073078.4 and an English translation of the Office Action. (50 pages).

* cited by examiner

PEST TRAPS

CROSS REFERENCE TO RELATED APPLICATIONS

This application is a U.S. National Phase Application of PCT International Application No. PCT/GB2021/052052, filed Aug. 9, 2021, which claims the benefit of GB Application No. 2014858.1, filed Sep. 21, 2020, the subject matter of each of these applications being incorporated by reference herein in their entireties for all purposes.

FIELD OF THE INVENTION

The present invention concerns pest traps. More particularly, but not exclusively, this invention concerns a pest trap that kills a pest detected in the trap by releasing a fluid, such as carbon dioxide. The invention also concerns kits of parts for pest traps, and methods of setting pest traps.

BACKGROUND OF THE INVENTION

Rodent traps that kill rodents using carbon dioxide have been known for some time. WO 2002/030189 A1 (Rentokil Initial UK Limited) published 18 Apr. 2002 discloses a rodent trap with an internal chamber with entrances at its ends. The rodent trap comprises electronic control means, including sensor means. When a rodent is detected in the chamber, covers are moved to close the entrances to the internal chamber, and carbon dioxide gas is released into the chamber, killing the rodent by asphyxiation.

While such traps can be effective, they have various drawbacks. For example, once the trap has caught a rodent, they cannot catch any further rodents until an operator has emptied and reset the trap, or the trap is replaced. As another example, as the electronic control means and sensor means of the rodent trap will be arranged to capture rodents of a particular type and/or exhibiting particular behaviour, the rodent trap cannot be used for other types of rodents or behaviours, and instead a different rodent trap will be required.

The present invention seeks to solve and/or mitigate some or all of the above-mentioned problems. Alternatively and/or additionally, the present invention seeks to provide an improved pest trap.

SUMMARY OF THE INVENTION

In accordance with a first embodiment of the invention there is provided a pest trap comprising:
 a main body;
 a first chamber connected to the main body, the first chamber comprising an opening arranged to allow a pest to enter the first chamber;
 a movable closure to the opening of the first chamber;
 a second chamber connected to the main body, the second chamber comprising an opening arranged to allow a pest to enter the second chamber;
 a movable closure to the opening of the second chamber;
 a sensor mechanism arranged to detect the presence of a pest in the first chamber or second chamber;
 a kill mechanism arranged, when activated, to release a fluid into the first chamber or second chamber to kill a pest within the first chamber or second chamber;
 wherein the pest trap is arranged, in response to the sensor mechanism detecting the presence of a pest in the first chamber, to close the movable closure to the opening of the first chamber, and to activate the kill mechanism to release the fluid into the first chamber; and
 wherein the pest trap is arranged, in response to the sensor mechanism detecting the presence of a pest in the second chamber, to close the movable closure to the opening of the second chamber, and to activate the kill mechanism to release the fluid into the second chamber.

Each of the first and second chamber can separately catch a pest. For each, when a pest is detected in the chamber, the movable closure closes the opening to the chamber. The closure prevents the pest from escaping from the chamber, and also acts to keep the fluid within the chamber with the pest, so that it can act to kill the pest. By having separate first and second chambers, when a pest is caught in one of the chambers, the other chamber is still available to catch further pests, and so further pests can be caught even while awaiting an operator to empty and reset the trap.

The first and second chambers may each have a first and a second end. The first and second chambers may have openings and respective movable closures at both ends, so that a pest can enter from either end of each chamber. Preferably, the first end is opposite the second end. Pests may be more likely to enter the first or second chamber if the pest is aware of a second opening through which it thinks it may be possible to exit the chamber.

The sensor mechanism may comprise a first sensor mechanism to detect a pest in the first chamber, and a second sensor mechanism to detect a pest in the second chamber.

The kill mechanism may comprise a first kill mechanism to release fluid into the first chamber, and a second kill mechanism to release fluid into the second chamber.

The first chamber may be located on a first face of the main body, and the second chamber located on a second face of the main body. In this case, preferably the first face of the main body is opposite the second face of the main body.

Advantageously, the first chamber is removably attached to the main body. This allows easy removal of pest caught in the first chamber, and also replacement of the first chamber entirely if desirable for hygiene reasons, for example. It also allows the pest trap to be configured as a single-chamber trap, if desired. The second chamber is also advantageously removably attached to the main body.

Advantageously, the main body comprises the kill mechanism.

Advantageously, the main body comprises the movable closure to the opening of the first chamber. The main body also advantageously comprises the movable closure to the opening of the second chamber. Advantageously, the main body comprises the movable closures to each opening of each chamber.

Preferably, the fluid is carbon dioxide gas. This kills a pest caught in the first or second chamber by asphyxiation. It will be appreciated that other fluids could be used, for example poisonous gases or liquids.

Preferably, the kill mechanism comprises a first vessel containing the fluid for release into the first chamber, and a second vessel containing the fluid for release into the second chamber. In this case, the kill mechanism preferably comprises: a first piercing mechanism comprising a first biased lance and a first latch that holds the first biased lance in an armed position, wherein when the first latch is released, the first biased lance penetrates the first vessel to release the fluid therein into the first chamber; and a second piercing mechanism comprising a second biased lance and a second latch that holds the second biased lance in an armed position, wherein when the second latch is released, the second biased lance penetrates the second vessel to release the fluid therein into the second chamber. The vessels may be, for example, two vessels containing pressurised carbon dioxide, in which case the pressurisation drives the carbon dioxide into the first or second chambers once the vessels are pierced.

Advantageously, the kill mechanism further comprises a rotary motor, and is arranged so that when the motor is driven in a first direction, it releases the first latch; and when the motor is driven in the opposite direction, it releases the second latch. This allows either/both chambers to have fluid released therein, as required on detection of a pest therein, using only a single triggering means.

Advantageously, the end of the first biased lance that penetrates the first vessel is a tapered cross-shape in cross-section. The end of the second biased lance that penetrates the second vessel is also advantageously cross-shaped in cross-section. Such a shape has been found to be particularly effective at piercing the vessel while also allowing the fluid within to escape while the lance remains embedded within the vessel.

Advantageously, the sensor mechanism is removably attached to the main body. In this case, the main body may comprise at least one rotatable arm, the rotatable arm being movable between a locked position in which the sensor mechanism is held in place on the main body, and an unlocked positon in which the sensor mechanism can be removed from the main body. The sensor mechanism may detect the presence of a pest in the first chamber or second chamber using an infrared sensor. The sensor mechanism may detect the presence of a pest in the first chamber or second chamber using an ultrasound sensor. The sensor mechanism may detect the presence of a pest in the first chamber or second chamber by sensing movement of a movable arm that extends into the first chamber or second chamber. Any other suitable types of sensor may be used, for example a capacitive sensor or a camera.

By having a removably attached sensor mechanism, and sensor mechanisms of different types as mentioned (but not limited to) above, different types of sensor mechanism can be used with the same trap to detect different types of pest and/or different behaviours.

The pest trap may be a rodent trap. Alternatively, the pest trap may be an insect trap. The pest trap may be a trap for any suitable type or combination of types of pest.

In accordance with a second embodiment of the invention there is provided a pest trap comprising:
  a main body;
  a chamber connected to the main body, the chamber comprising an opening arranged to allow a pest to enter the chamber;
  a movable closure to the opening of the chamber;
  a sensor mechanism arranged to detect the presence of a pest in the chamber;
  a kill mechanism comprising:
    a vessel containing fluid,
    a piercing mechanism comprising a biased lance and a latch that holds the biased lance in position, wherein when the latch is released, the biased lance penetrates the vessel to release the fluid therein into the chamber;
  wherein the pest trap is arranged, in response to the sensor mechanism detecting the presence of a pest in the chamber, to close the movable closure to the opening of the first chamber, and to release the latch of the piercing mechanism so that the fluid in the vessel is released into the chamber to kill the pest detected within the chamber; and
  wherein the end of the biased lance that penetrates the vessel is a tapered cross-shape in cross-section.

Such a shape has been found to be particularly effective at piercing the vessel while also allowing the fluid within to escape while the lance remains embedded within the vessel.

Advantageously, the chamber is removably attached to the main body.

Advantageously, the main body comprises the kill mechanism.

Advantageously, the main body comprises the movable closure to the opening of the chamber.

Preferably, the fluid is carbon dioxide gas.

Advantageously, the sensor mechanism is removably attached to the main body. In this case, the main body may comprise at least one rotatable arm, the rotatable arm being movable between a locked position in which the sensor mechanism is held in place on the main body, and an unlocked positon in which the sensor mechanism can be removed from the main body. The sensor mechanism may detect the presence of a pest in the chamber using an infrared sensor. The sensor mechanism may detect the presence of a pest in the chamber using an ultrasound sensor. The sensor mechanism may detect the presence of a pest in the chamber by sensing movement of a movable arm that extends into the chamber.

The pest trap may be a rodent trap. Alternatively, the pest trap may be an insect trap. The pest trap may be a trap for any suitable type or combination of types of pest.

In accordance with a third embodiment of the invention there is provided a pest trap comprising:
  a main body;
  a chamber connected to the main body, the chamber comprising an opening arranged to allow a pest to enter the chamber;
  a movable closure to the opening of the chamber;
  a sensor mechanism arranged to detect the presence of a pest in the chamber;
  a kill mechanism arranged, when activated, to release a fluid into the chamber to kill a pest within the chamber;
  wherein the pest trap is arranged, in response to the sensor mechanism detecting the presence of a pest in the chamber, to close the movable closure to the opening of the chamber, and to activate the kill mechanism to release the fluid into the chamber; and
  wherein the sensor mechanism is removably attached to the main body.

By having a removably attached sensor mechanism, different types of sensor mechanism can be used with the same trap to detect different types of pest and/or different behaviours.

The main body may comprise at least one rotatable arm, the rotatable arm being movable between a locked position in which the sensor mechanism is held in place on the main body, and an unlocked positon in which the sensor mechanism can be removed from the main body.

The sensor mechanism may detect the presence of a pest in the chamber using an infrared sensor. The sensor mechanism may detect the presence of a pest in the chamber using an ultrasound sensor. The sensor mechanism may detect the presence of a pest in the chamber by sensing movement of a movable arm that extends into the chamber.

Advantageously, the chamber is removably attached to the main body.

Advantageously, the main body comprises the kill mechanism.

Advantageously, the main body comprises the movable closure to the opening of the chamber.

Preferably, the fluid is carbon dioxide gas.

Preferably, the kill mechanism comprises a vessel containing the fluid for release into the chamber. In this case, advantageously the kill mechanism comprises a piercing mechanism comprising a biased lance and a latch that holds the biased lance in position, wherein when the latch is released, the biased lance penetrates the vessel to release the fluid therein into the chamber.

The pest trap may be a rodent trap. Alternatively, the pest trap may be an insect trap. The pest trap may be a trap for any suitable type or combination of types of pest.

In accordance with a fourth embodiment of the invention there is provided a kit of parts comprising a pest trap as described above, and at least two sensor mechanisms that are arranged to detect the presence of a pest using different physical properties.

The at least two sensor mechanisms may detect the presence of a pest in the chamber using physical properties taken from the set of: infrared waves; ultrasonic waves; movement of a movable arm.

In accordance with a fifth embodiment of the invention there is provided a method of setting a pest trap as discussed above, comprising the steps of:

selecting a sensor mechanism from a plurality of sensor mechanisms that are arranged to detect the presence of a pest using different physical properties;

attaching the selected sensor mechanism to the pest trap.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

A pest trap in accordance with a first embodiment of the invention is now described, with reference to FIGS. 1 to 7d.

The pest trap according to the first embodiment of the present invention is a rodent trap.

Figure 1:
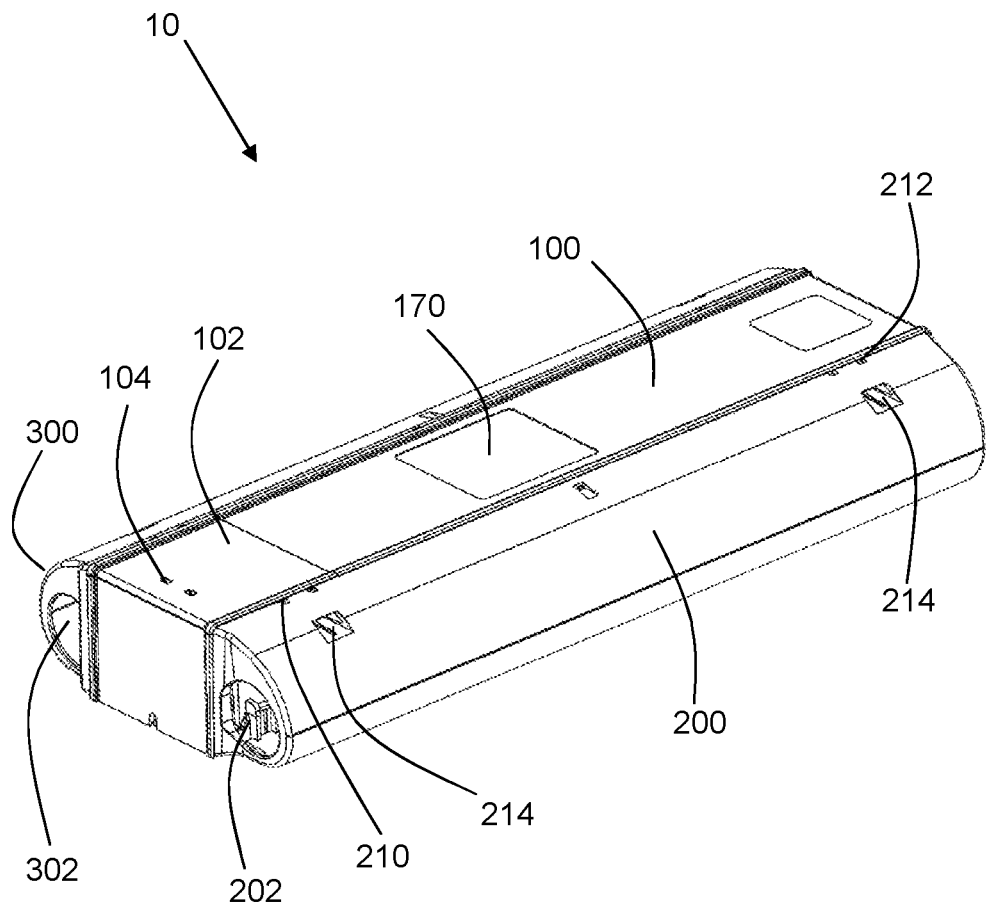
FIG. 1 shows a perspective view of a pest trap according to a first embodiment of the present invention.

FIG. 1 shows a perspective view of the rodent trap 10. The rodent trap 10 comprises a main body 100, a first chamber 200, and a second chamber 300. The first chamber 200 and the second chamber 300 are connected to opposite faces of the main body 100.

Figure 4:
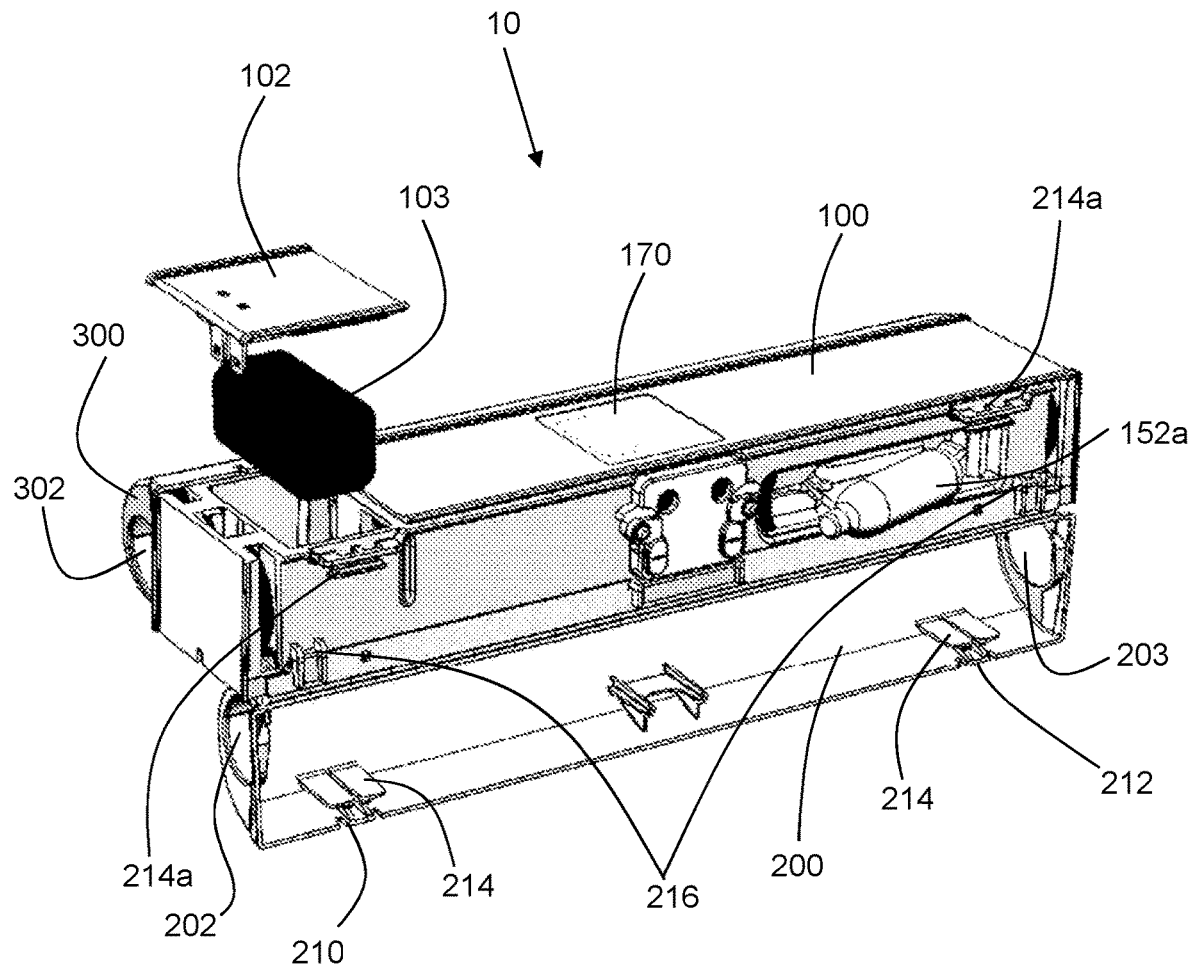
FIG. 4 shows a perspective view of the pest trap according to the first embodiment of the present invention.

Each of the first chamber 200 and the second chamber 300 are connected by their lower ends to the main body 100 by hinges, allowing them to be opened as shown in FIG. 4. At the top of each of the first chamber 200 and the second chamber 300 there are provided latches 214 which secure the first chamber 200 and the second chamber 300 to the main body 100.

The first chamber 200 comprises at one end an opening 202, which has a diameter large enough for a rodent, such as a mouse, to enter. The second chamber 300 also comprises an opening 302 at one end, similar to the opening 202. Both the first chamber 200 and second chamber 300 have corresponding additional openings 203, 303 at their opening ends opposite the openings 202, 302 respectively, the corresponding opening for the first chamber 200 being visible in FIG. 4.

In other embodiments of the invention, the opening has a diameter large enough to allow a large rat to enter the chamber, for example.

The main body includes a battery cover 102, underneath which a battery 103 shown in FIG. 4 is housed. The battery cover 102 is also connected to the main body by a latch (not shown). Each of the latches 214 (including the battery cover 102 latch) can be opened by insertion of a service key 600 (shown in FIG. 7) into the respective pairs of holes 104, 210, 212, as discussed in more detail later below.

The main body also includes a control system cover 170, underneath which an electronic control system is housed, which controls the operation of the trap as described below. In addition to controlling the operation of the rodent trap 10, in embodiments of the invention the control system may have other functionality. The control system may be able to communicate with a remote system, via wireless communication for example (e.g. over mobile telephone networks, or Wi-Fi, or as an "Internet of Things" device.) to provide an alert when a rodent is captured. The control system may be able to communicate with a remote system via 'long reach' technology. The control system may comprise an accelerometer to ensure safe handling of the unit, and/or a temperature sensor to ensure the rodent trap 10 functions correctly when triggered. The accelerometer may also detect whether the rodent trap has been tampered with, or moved, after the rodent trap has been commissioned. The rodent trap 10 may comprise magnetic sensors on movable parts of the rodent trap 10, using which the control system can ensure that the trap is set correctly by an operator, and provide a warning to the operator if not.

Figure 2A:
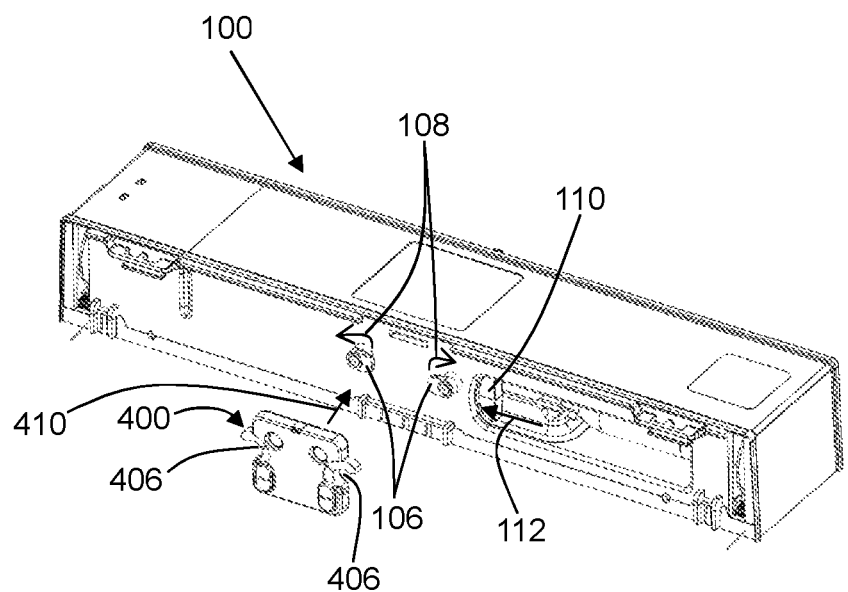
FIGS. 2a and 2b show a perspective view of a main body of the pest trap according to the first embodiment of the present invention.

FIG. 2a shows a perspective view of the main body 100 of the rodent trap 10. Also shown in FIG. 2a is a sensor 400 detached from the main body 100. When the first chamber 200 is in place on the side of the main body 100, the sensor 400 is within the first chamber 200, and so can detect the presence of a rodent within the first chamber 200.

The sensor 400 comprises an infrared sensor. The sensor 400 also comprises a pair of semi-circular shaped recesses 406 located on opposite edges of the sensor 400, the recesses 406 also extending outwards from the edges of the sensor 400 to form projections.

In order to attach the sensor 400 to the main body 100, the movable arms 106 are each rotated in opposite directions 108 to allow the sensor 400 to be moved in the direction 410 towards the main body 100. Once the sensor 400 abuts against the main body 100, the rotatable arms 106 are returned back to the position shown in FIG. 2a, locking the sensor in position against the main body 100.

Figure 2B:
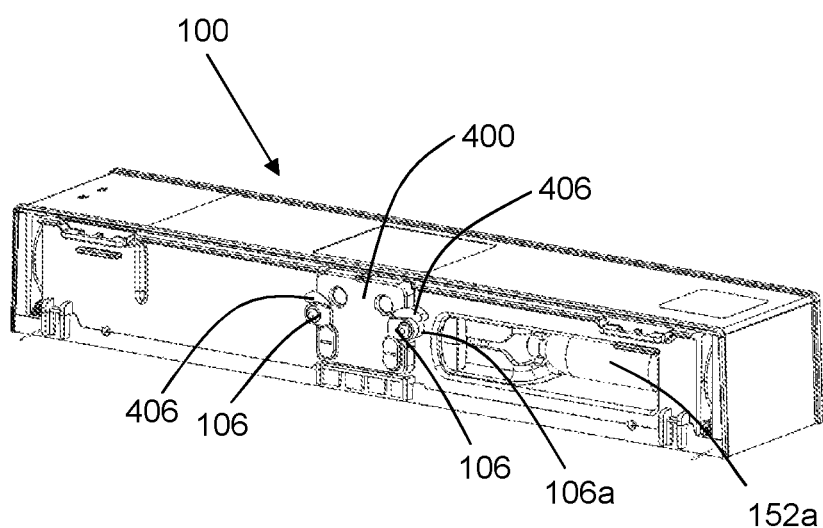

FIG. 2b shows a perspective view of the main body 100, with the sensor 400 attached to the main body 100. As can be seen, when the sensor 400 is attached to the main body, each recess 406 is engaged with the pivot portion 106a of the rotatable arm 106 such that they keep the sensor 400 in position on the main body 100.

When the sensor 400 is attached to the main body 100, it is in electronic communication with the control system, via a plug on the back of the sensor 400 (not shown) that is inserted into a corresponding hole in the side of the main body 100 between the movable arms 106.

In other embodiments of the invention, the rotatable arms 106 may be biased towards the locked position, or may freely rotate, for example. It will be appreciated that in other embodiments, a sensor may be attached to the main body 100 in various other suitable ways.

A corresponding sensor (not shown) is removably mounted on the opposite side of the main body 100, so that it is within the second chamber 200 and can detect the presence of a rodent within the second chamber 200.

A vessel 152a of carbon dioxide can also be seen housed within the main body 100, and is described in more detail below.

Figure 2C:
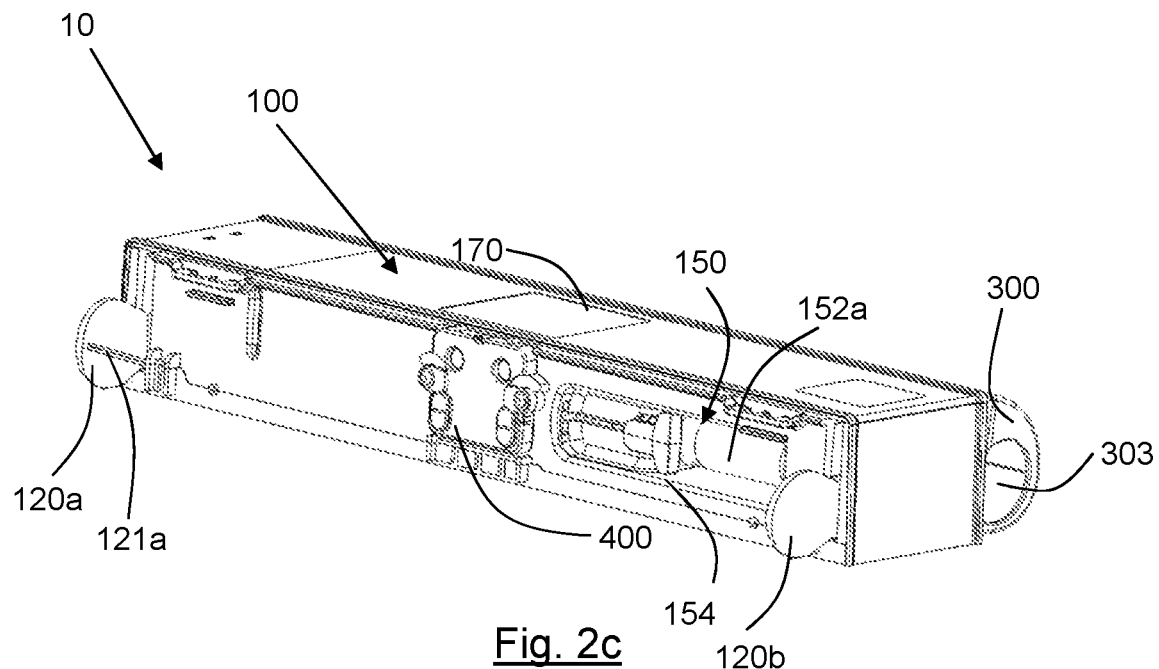
FIGS. 2c and 2d show a perspective view of the main body and a second chamber according to the first embodiment of the present invention.
Figure 2D:
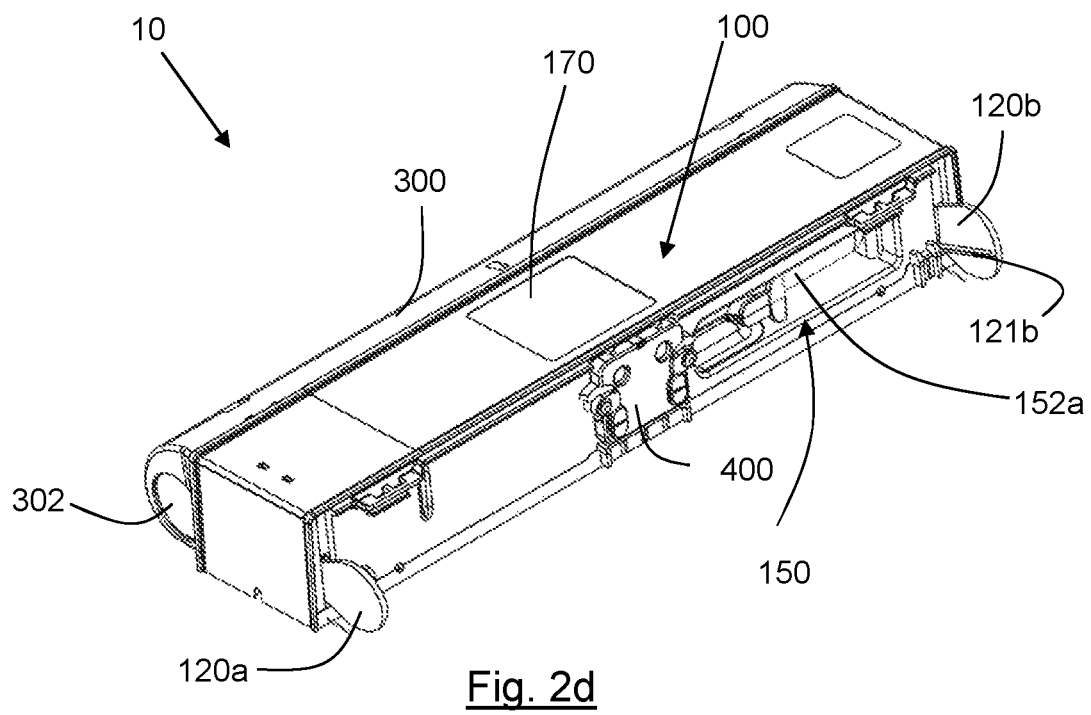

FIGS. 2c and 2d each show a perspective view of the main body 100 from different angles. The main body 100 is shown after the sensor 400 has detected a rodent in the first chamber 200, and so the kill mechanism 150 has been activated by the control system and transitioned into the triggered position. The first chamber 200 has been removed to show the inside workings of the rodent trap 10.

The first chamber 200 includes a pair of doors 120a and 120b. Door 120a is biased towards a "closed" position by a spring 121a to close the opening 202 (as shown in FIG. 1), and door 120b by a corresponding spring 121b to close the opening 203 (as shown in FIG. 4). When the rodent trap 10 is set, the doors 120a and 120b are pushed into the main body 100 into an "open" position where they are held in position by catches. In the position shown, the activation of the kill mechanism 150 by the control system has released the catches so that the doors 120a and 120b have been moved to the closed position by the springs 121a and 121b. With the doors 120a and 120b in the closed position, a rodent within the first chamber is not able to escape. The doors 120a and 120b also act to reduce the amount of gas that can pass in and out of the first chamber 200.

The activation of the kill mechanism 150 by the control system also causes the vessel 152a of carbon dioxide to be pierced, as described in more detail below. This releases the carbon dioxide within the vessel 152a, which floods into the first chamber 200 via the aperture 154, asphyxiating the rodent trapped within.

The operation of the rodent trap 10 when a rodent is detected in the second chamber 300 is essentially identical, with a further vessel 152b of carbon dioxide being pierced to flood the second chamber 300 with carbon dioxide.

Figure 3:
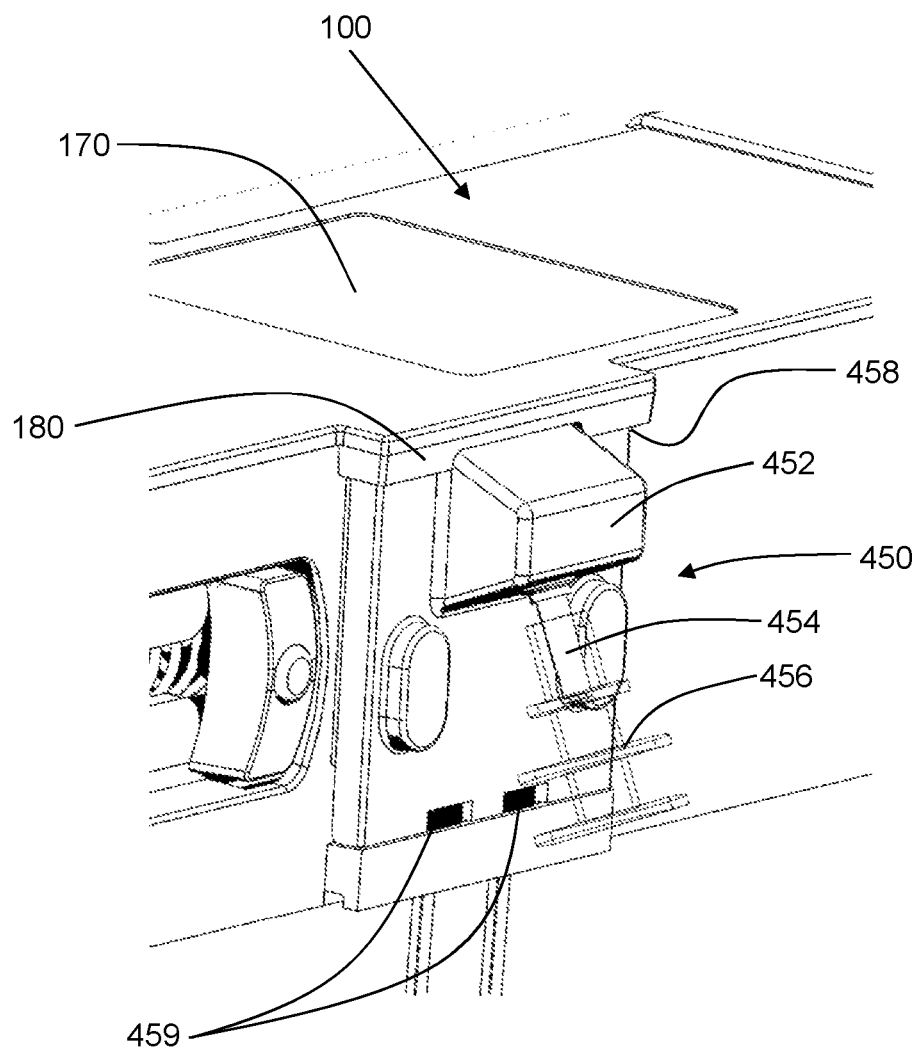
FIG. 3 shows a perspective view of a sensor according to a second embodiment of the present invention.

In embodiments of the present disclosure, the pair of doors are arranged to swing from an open position to a closed position about an axis of rotation that is orthogonal to the plane of an opening of the chamber. The pair of doors may be connected by a common axle. The pair of doors may be biased towards the closed position. Having the pair of doors connected by a common axle means that only one catch may be needed for each pair of doors, such that when the catch is released, both doors of the pair of doors moves from the open to the closed position simultaneously. In embodiments of the present invention, the doors are contained within a recess within the main body FIG. 3 shows a perspective view of a sensor 450 according to a second embodiment of the present invention, which can be used in place of the sensor 400. The sensor comprises a switch 452, with an arm 452 extending from the housing. On the arm 452 is a lure attachment 456, which comprises three spaced-apart circular discs, onto which bait, bedding material or the like can be attached. When a rodent takes the bait, bedding or the like from the lure attachment 456, the rodent will move the arm 452 of the switch 452, triggering the sensor 450.

In embodiments of the present invention, the switch may resist movement up to a threshold amount of force. The threshold amount of force may be high enough such that insects do not trigger the sensor. The threshold amount of force may be such that only force equal to or greater than that of a rodent pressing against the bait attachment triggers the sensor.

It will be appreciated that various other sensors could be used in other embodiments of the invention, to enable different types of pest, or different pest behaviours, to be more effectively detected. For example, sensors that detect the presence of a rodent using other physical properties. The sensor may be a transducer. An ultrasound sensor, capacitive sensor, and/or microphone may be used, for example. The sensor may be a camera. The camera may produce an output, and the control system may be configured to interpret/ categorise the camera output and thereby activate the kill mechanism. The activation of the kill mechanism may be conditional on a type of pest that is pre-selected. Further sensors that are calibrated differently may be used. For example, a sensor intended to detect mice may use infrared, and have a low threshold for detection, while a sensor intended to detect rats may use also use infrared, but with a higher threshold for detection. The sensor intended for rats may not reliably detect a mouse, but will also be less prone to false positives (for example small insects are also less likely to trigger a 'false positive').

In a method in accordance with an embodiment of the invention, an operator can select a suitable sensor or sensors to use with the pest trap when setting it. A kit of parts of a pest trap and different types of sensor may be provided in accordance with an embodiment of the invention, for use in such a method. Suitable sensors may be selected to use with the pest trap, dependent on the type of pest that is to be trapped. By selecting a suitable sensor, the pest trap may be configured to be an insect trap, for example. The selection of a suitable sensor may include selecting from at least two the same type of sensor (for example a pair of ultrasound sensors), but which are calibrated/configured to respond to different pests. This may be achieved by calibrating the threshold of the sensor, which triggers the kill mechanism to activate. The selection of a suitable sensor may include selecting from at least two different types of sensor (for example one infrared sensor, and one ultrasound sensor). The sensor of the first type may enable the pest trap to be configured to trap rodents, while the sensor of the second type may enable the pest trap to be configured to trap insects, for example. The selection of the sensor may also enable to pest trap to distinguish between different species of rodents (such as rats and mice, for example) and/or different species of insects.

FIG. 4 shows a perspective view of the rodent trap 10, with the first chamber 200 opened. As discussed above, the first chamber 200 is connected to a lower edge of the main body 100 by a pair of hinges 216, which allow the chamber 200 to swing downwards and outwards away from the main body 100.

The first chamber 200 comprises at its top a pair of latches 214. The latches 214 engage with hooks 214a when the chamber 200 is pivoted about the hinges 216 such that the latches 214 engage with the hooks 214a to keep the first chamber 200 closed against the main body 100. The first chamber 200 is also provided with key-holes 210, 212 that are arranged to receive the service key 600. When the service key is inserted into the key-holes 210, 212, the latch 214 is depressed and brought out of engagement with the hooks 214a, such that the chamber 200 can be freely rotated about its hinges 216. The second chamber 300 has corresponding features.

FIG. 4 also shows the battery cover removed 102, revealing the battery 103 that is housed in the main body 100. The battery 103 is used to power the parts of the rodent trap 10, e.g. the control system 170, kill mechanism 150, sensor 400 and so on.

FIG. 4 also shows the vessel 152a of carbon dioxide. As can be seen, the vessel 152a is removable, so that it can be replaced after use.

Figure 5A:
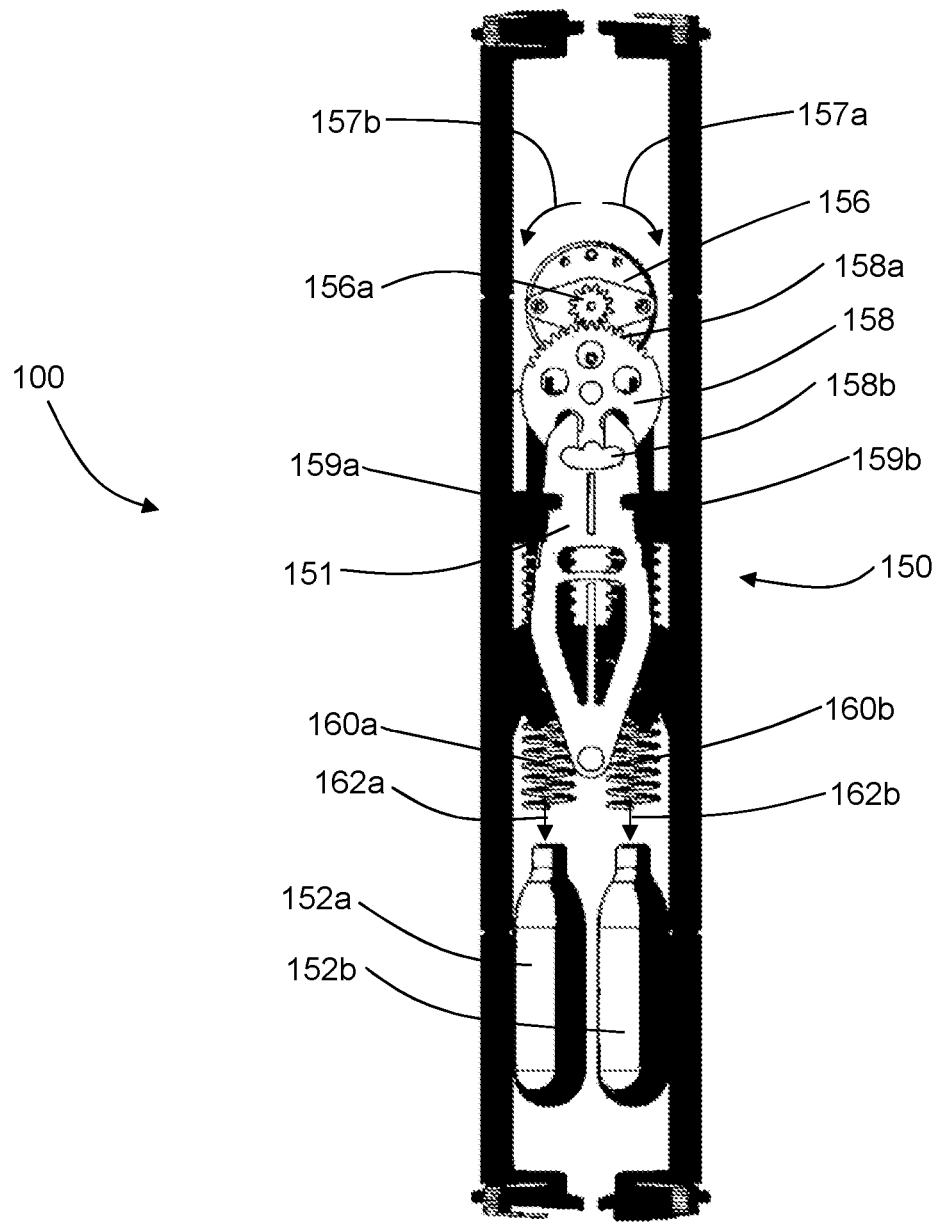
FIG. 5a shows an underside view of the pest trap according to the first embodiment of the present invention.

FIG. 5a shows an underside view of the rodent trap 100. The rodent trap 100 is shown without the chambers 200, 300 attached to the main body 100.

The kill mechanism 150 is operated by a single motor 156, which turns a cog 156a. The cog 156a is in engagement with a larger cog 158, of which only a toothed portion 158a comprises teeth suitable for meshing with the cog 156a. On the side of the larger cog 158 opposite the tooth portion 158a is a post 158b, which engages with a first end of an arm 151, the other end of which is attached to a pivot.

When the motorised gear assembly 156 rotates in a clockwise direction 157a, the larger gear 158 rotates in an anticlockwise direction, and the pivoted arm 151 clockwise around its pivot, so that the body of the pivoted arm 151 moves rightwards. This causes the body of the pivoted arm 151 to release a first catch 159a holding a first sprung piercing arm 160a in place, so that it moves in the direction shown by the arrow 162a. This causes it to pierce the vessel 152a associated with the first chamber 200, releasing the carbon dioxide within.

Similarly, when the motorised gear assembly 156 rotates in an anticlockwise direction 157a, the larger gear rotates in a clockwise direction. This moves the pivoted arm 151 anticlockwise around its pivot, so that the body of the pivoted arm 151 moves leftwards. This causes the body of the pivoted arm 151 to release a second catch 159b holding a second sprung piercing arm 160b in place, causing it to move in the direction shown by the arrow 162b, and pierce the vessel 152b associated with the second chamber 300.

In this way, by moving the cog in the desired direction, the kill mechanism 150 can kill a mouse detected in the first chamber 200 or second chamber 300 as appropriate.

Figure 5B:
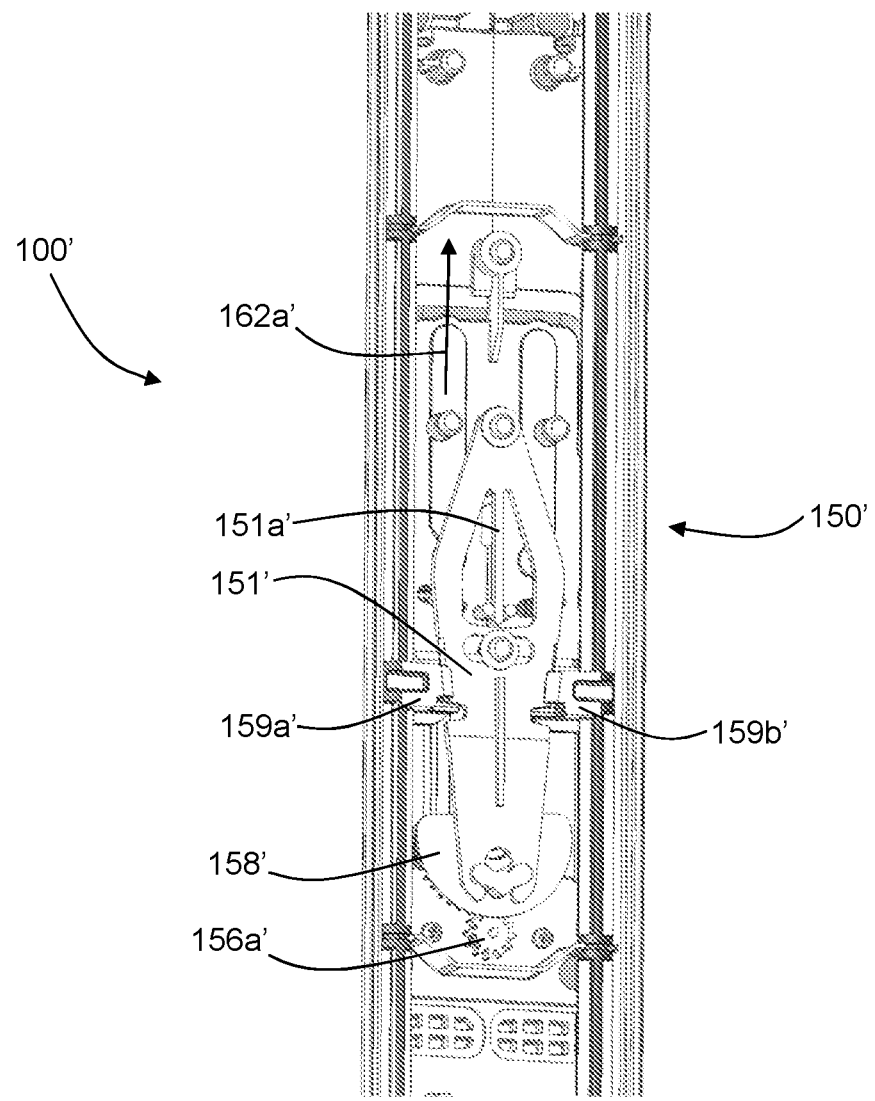
FIG. 5b shows an underside view of the pest trap according to a second embodiment of the present invention.
Figure 5C:
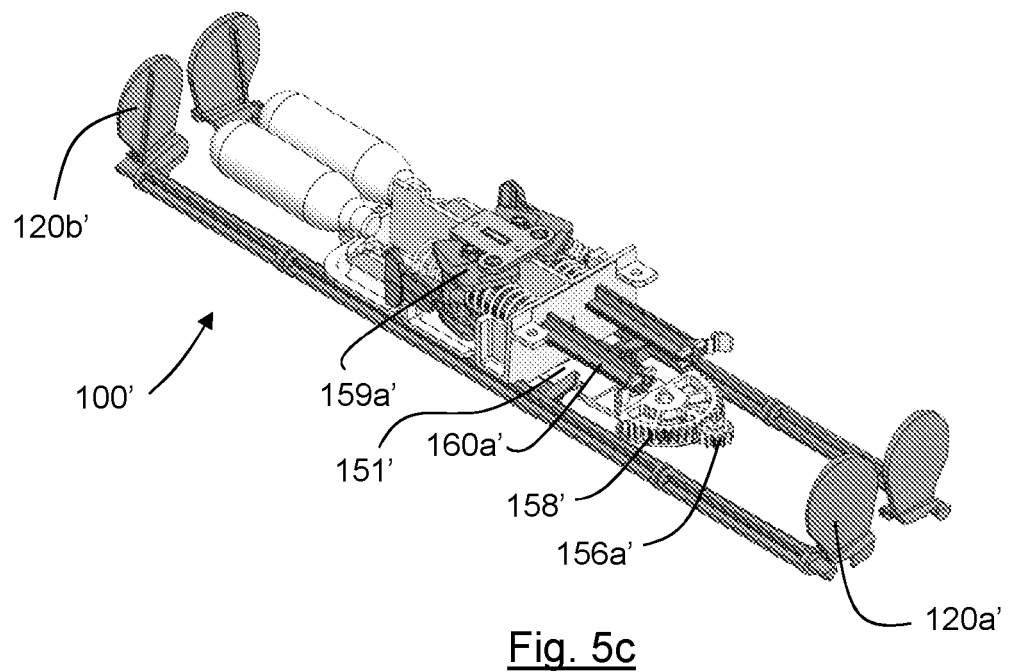
FIGS. 5c to 5f show a perspective view of a pest trap according to the second embodiment of the present invention.

FIG. 5b shows an underside view of a rodent trap 100' according to a second embodiment of the present invention. The rodent trap is shown without the chambers 200, 300. Like reference numerals denote similar features to those described in FIG. 5a.

The kill mechanism 150' includes a motor that rotates a cog 156a'. The cog 156a' drives a larger driven cog 158'. The cog 158' is also engaged at one end to an arm 151'. The arm 151' includes a leaf spring 151a', which biases the arm 151 towards a central position relative to the rodent trap 100'. When the cog 156a' rotates in a clockwise direction, the driven cog 158a' rotates in an anticlockwise direction, causing the arm 151' to pivot and also rotate in an anticlockwise direction. The movement of the arm 151' in the anticlockwise direction (and therefore rightwards, relative to the page) causes a catch 159a to be released. Upon release of the catch 159a', a sprung piercing arm (not shown) is released in the direction 162a', to pierce a vessel filled with carbon dioxide (also not shown).

FIGS. 5c to 5f show a perspective view of a rodent trap 100' according to the second embodiment of the present invention. The rodent trap is shown without the chambers 200,300. FIGS. 5c to 5f show the activation sequence of the rodent trap 100'. FIG. 5a shows the rodent trap in the armed position: the pair of doors 120a', 120b' are in the open position (and would be recessed within the main body if it were shown); and the first sprung piercing arm 160a' is in the armed position.

Figure 5D:
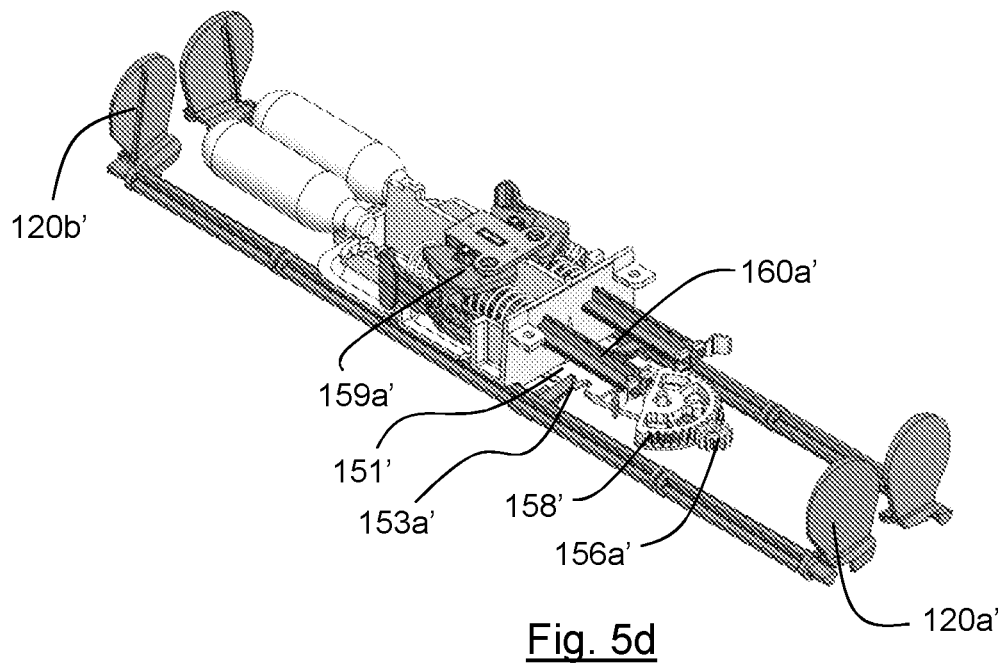

FIG. 5d shows the rodent trap 100' in a first step after being triggered. The cog 156a' rotates clockwise, driving the larger gear 158' to rotate anticlockwise. The gear 158' is linked to an arm 151'. As the gear 158' rotates anticlockwise, the arm 151' is caused to move to the right (relative to the page), thereby releasing a catch 153a'. The catch 153a' holds the doors 120a', 120b' in the open position when the trap is in a non-triggered state.

Figure 5E:
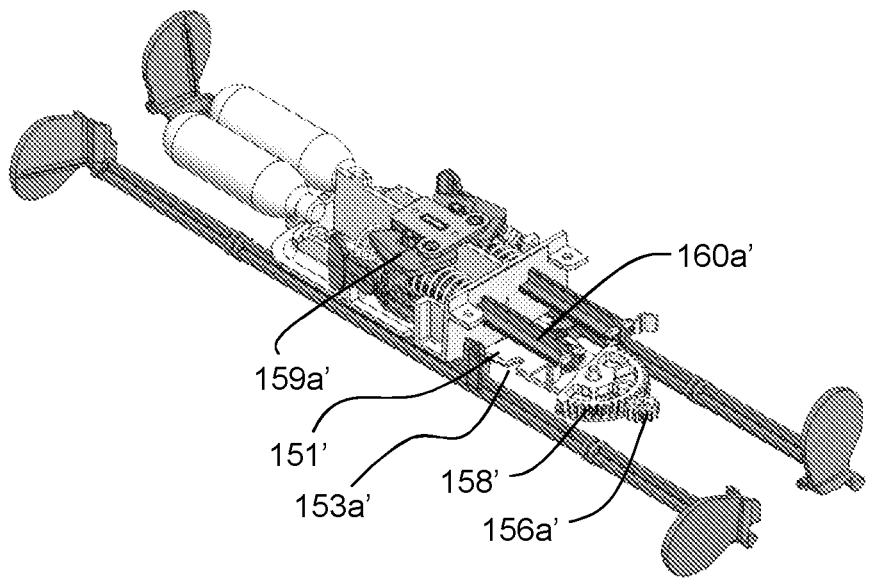
Figure 5F:
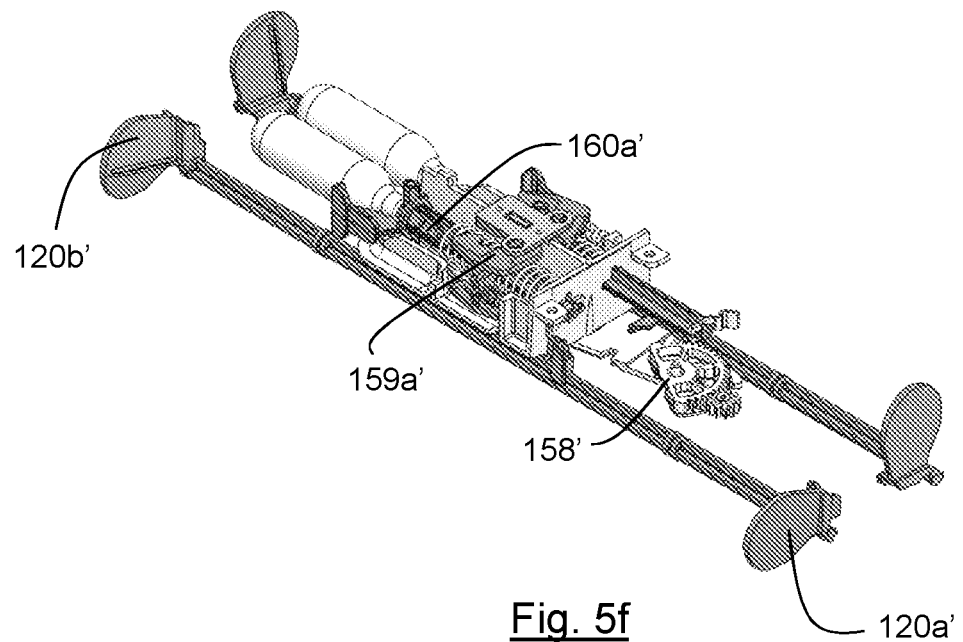

FIG. 5e shows the doors 120a', 120b' having moved to the closed position after release of the catch 153a'. The doors 120a', 120b' are biased towards the closed position. The gear 156a' continues to rotate in the clockwise direction, causing the gear 158' to move anticlockwise and move the arm 151' further to the right. The movement of the arm 151' further to the right releases the catch 159a'. The release of the catch 159a' causes the sprung piercing arm 160a' to move from the armed position to the triggered position. FIG. 5f shows the kill mechanism in the triggered position, after the sprung piercing arm 160a' has moved from the armed position to the triggered position thereby piercing the vessel containing carbon dioxide.

Figure 6:
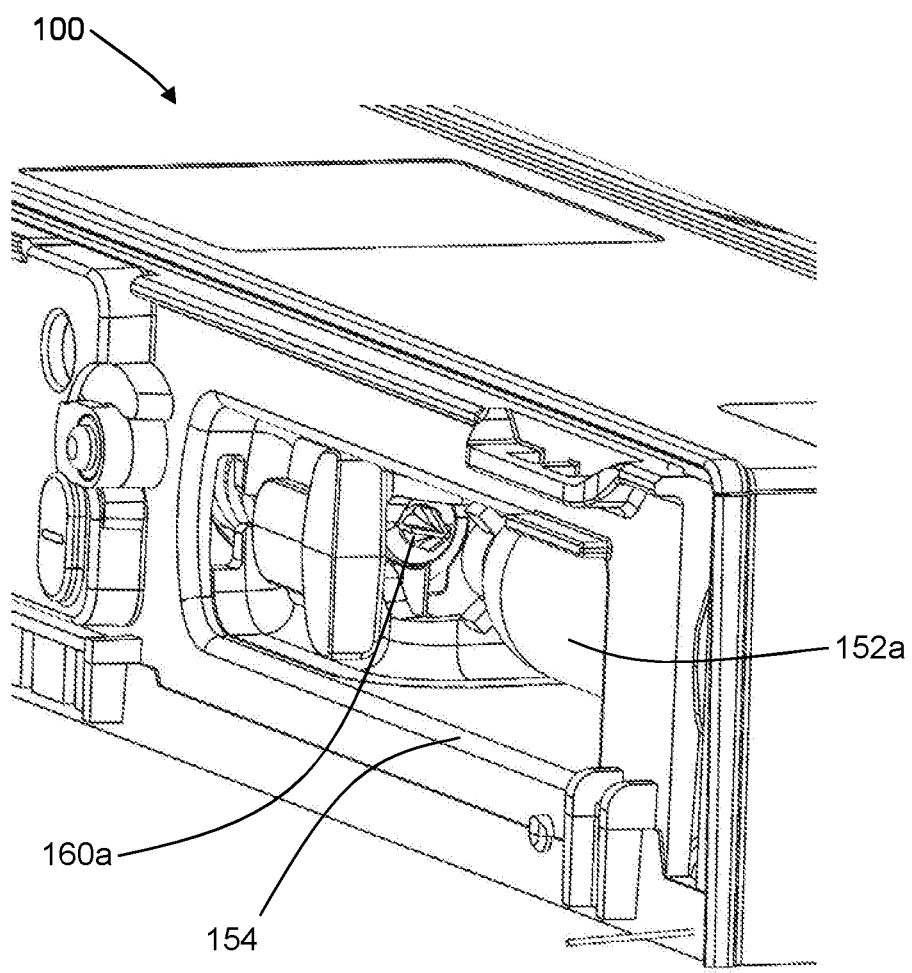
FIG. 6 shows a perspective view of a kill mechanism according to the first embodiment of the present invention.

FIG. 6 shows a perspective view of the kill mechanism 150. The end of the first sprung piercing arm 160a can be seen. This is the end that comes into contact with and pierces the vessel 152a to release the carbon dioxide within. The tapered end has a cross-shaped cross-section (when the cross-sectional plane is orthogonal to the central axis of the arm 160a), similar to a cross-head screwdriver tip. This enables the arm 160a to pierce the top of the vessel 152a, while allowing the carbon dioxide gas to escape between the gaps between the cross parts. When released, the carbon dioxide flows from the main body 100, through the common aperture 154, and into the chamber 200.

FIGS. 7a to 7d shows perspective views of a service key 600, according to the first embodiment of the present invention.

Figure 7A:
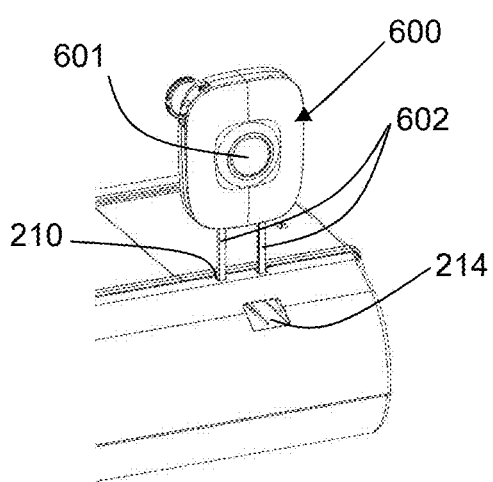
FIGS. 7a to 7d shows perspective views of a service key, according to the first embodiment of the present invention.

FIG. 7a shows the service key 600 being used to disengage the latch 214 of the chamber 200, such that the chamber 200 can be rotated and opened with respect to the main body. The service key 600 comprises a pair of prongs 602 that enter the key hole 210 to depress the latch 214 out of engagement with its hook (not shown). The service key 600 also comprises a magnet 601. In embodiments of the present invention, the magnet 601 is configured to interact with the main body 100 to activate a display comprised in the main body 100. In embodiments of the present invention, the magnet 601 is configured to activate the display, and is used to select options and/or settings in the control system. The options and/or settings may correspond to sensor calibration settings that are pre-loaded onto the control system, for example.

Figure 7B:
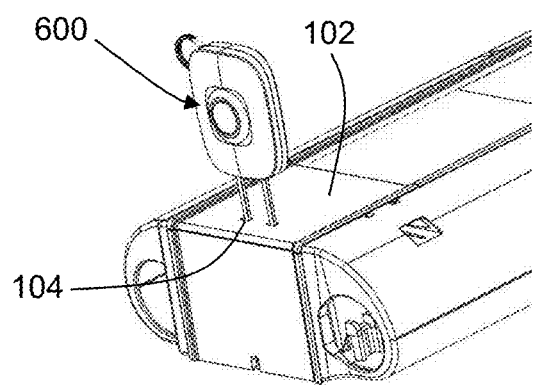

FIG. 7b shows the service key 600 being used for a similar function as is shown in FIG. 7a. The prongs of the service key are pushed into the keyhole 104 to disengage a latch from engagement with a hook, such that the battery cover 102 can be removed and access can be gained to the battery 103 (not shown), to replace it when it runs out of power, for example.

Figure 7C:
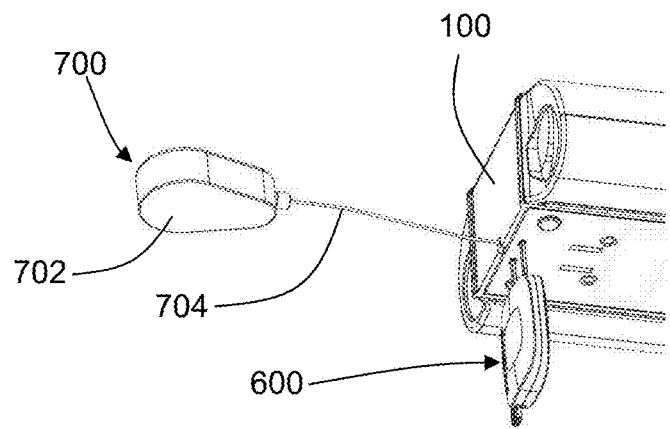

FIG. 7c shows the service key 600 being used to detach a lanyard 700 from the main body 100. The lanyard has a base 702 and a cable 704. The base 702 is connected to one end of the cable 704, and at the other end of the cable 704 is a lanyard engagement piece (not shown). The base 702 can be fixed via adhesive, or by a fixing means such as a screw or nail to a rigid and fixed surface, to prevent relocation or theft of the rodent trap.

Figure 7D:
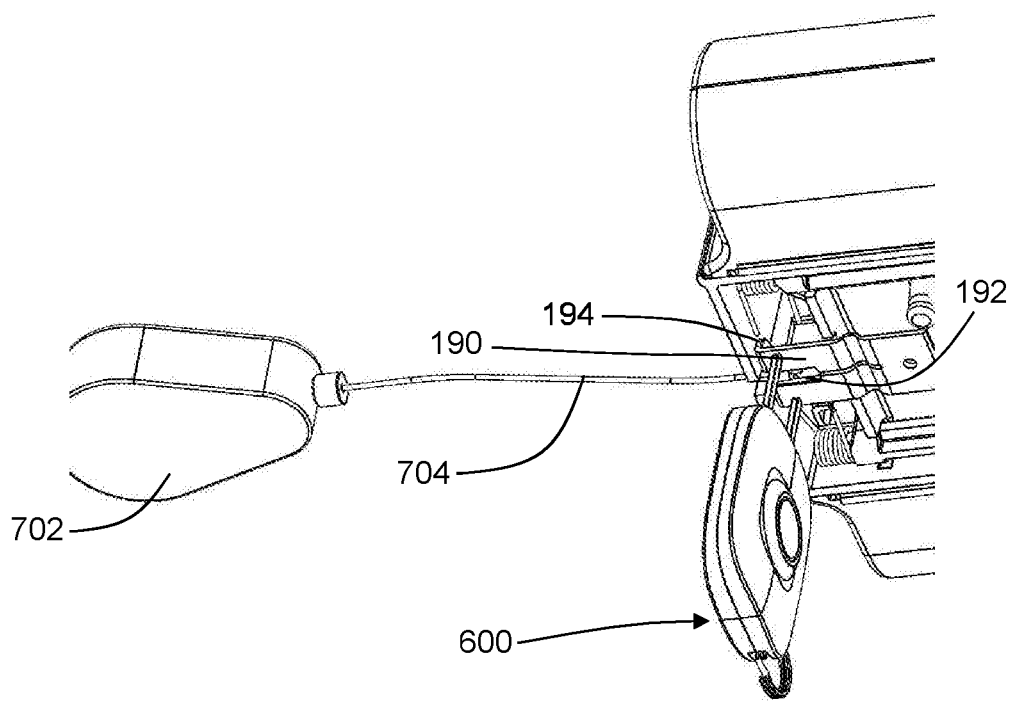

FIG. 7d shows the latch mechanism 190 for the lanyard 700 in more detail. The lanyard engagement piece (not visible) is small enough to pass through the slit 192 in the latch 190. However, the lanyard engagement piece is too large to pass through the latch protrusions 194. Therefore, when the service key 600 is pushed into the keyhole, the prongs 602 push the latch 190 away such that the lanyard engagement piece is forced through the slit 192 and the cable 704 and lanyard engagement piece can be pulled freely out from the main body 100.

In other embodiments of the invention, the base of the lanyard contains a spool of cable wrapped around a sprung mechanism, such that the cable can be unwound from inside the base, but the cable is biased towards being wrapped around the spool within the base. This enables a user/maintenance personnel to perform maintenance more easily as the pest trap can be more easily manipulated without the constraint or inconvenience of a short fixed length of cable.

While the present invention has been described and illustrated with reference to particular embodiments, it will be appreciated by those of ordinary skill in the art that the invention lends itself to many different variations not specifically illustrated herein.

The invention claimed is:

1. A pest trap comprising:
a main body;
a first chamber connected to the main body, the first chamber comprising an opening arranged to allow a pest to enter the first chamber;
a movable closure to the opening of the first chamber;
a second chamber connected to the main body, the second chamber comprising an opening arranged to allow a pest to enter the second chamber;
a movable closure to the opening of the second chamber;
a sensor mechanism arranged to detect the presence of a pest in the first chamber or second chamber;
a kill mechanism arranged, when activated, to release a fluid into the first chamber or second chamber to kill a pest within the first chamber or second chamber;
wherein the pest trap is arranged, in response to the sensor mechanism detecting the presence of a pest in the first chamber, to close the movable closure to the opening of the first chamber, and to activate the kill mechanism to release the fluid into the first chamber;
wherein the pest trap is arranged, in response to the sensor mechanism detecting the presence of a pest in the second chamber, to close the movable closure to the opening of the second chamber, and to activate the kill mechanism to release the fluid into the second chamber;
wherein the kill mechanism comprises:
a first piercing mechanism comprising a first biased lance and a first latch that holds the first biased lance in an armed position, wherein when the first latch is released, the first biased lance penetrates the first vessel to release the fluid therein into the first chamber; and
a second piercing mechanism comprising a second biased lance and a second latch that holds the second biased lance in an armed position, wherein when the second latch is released, the second biased lance penetrates the second vessel to release the fluid therein into the second chamber; and
wherein the kill mechanism further comprises a rotary motor, and is arranged so that when the motor is driven in a first direction, it releases the first latch; and when the motor is driven in the opposite direction, it releases the second latch.

2. The pest trap as claimed in claim 1, wherein the first chamber is located on a first face of the main body, and the second chamber is located on a second face of the main body.

3. The pest trap as claimed in claim 2, wherein the first face of the main body is opposite the second face of the main body.

4. The pest trap as claimed in claim 1, wherein the first chamber is removably attached to the main body.

5. The pest trap as claimed in claim 1, wherein the main body comprises the kill mechanism.

6. The pest trap as claimed in claim 1, wherein the main body comprises the movable closure to the opening of the first chamber.

7. The pest trap as claimed in claim 1, wherein the fluid is carbon dioxide gas.

8. The pest trap as claimed in claim 1, wherein the end of the first biased lance that penetrates the first vessel is a tapered cross-shape in cross-section.

9. The pest trap as claimed in claim 1, wherein the sensor mechanism is removably attached to the main body.

10. The pest trap as claimed in claim 9, wherein the sensor mechanism detects the presence of a pest in the first chamber or second chamber using an infrared sensor.

11. The pest trap as claimed in claim 9, wherein the sensor mechanism detects the presence of a pest in the first chamber or second chamber by sensing movement of a movable arm that extends into the first chamber or second chamber.

12. The pest trap as claimed in claim 1, wherein the sensor mechanism detects the presence of a pest in the chamber using an ultrasound sensor.

13. The pest trap as claimed in claim 1, wherein the sensor mechanism detects the presence of a pest in the chamber by sensing movement of a movable arm that extends into the chamber.

* * * * *